No. 638,194.  
A. J. ARNOLD.  
REEL FOR ANGLING, &c.  
(Application filed Apr. 15, 1899.)  
(No Model.)  
Patented Nov. 28, 1899.

Witnesses:  
John Enders Jr.  
F. B. Keeley

Inventor  
Albert J. Arnold  
by  
L. M. Hosea  
Attorney.

UNITED STATES PATENT OFFICE.

ALBERT J. ARNOLD, OF NATIONAL CITY, CALIFORNIA, ASSIGNOR OF FIVE-EIGHTHS TO WALTER FRAZIER, OF SAME PLACE, AND TRIPP BROS., OF NORTH VERNON, INDIANA.

REEL FOR ANGLING, &c.

SPECIFICATION forming part of Letters Patent No. 638,194, dated November 28, 1899.

Application filed April 15, 1899. Serial No. 713,194. (No model.)

*To all whom it may concern:*

Be it known that I, ALBERT J. ARNOLD, a citizen of the United States, residing at National City, in the county of San Diego and State of California, have invented certain new and useful Improvements in Reels for Angling and for other Purposes, of which the following is a specification.

My invention relates to "reels" for winding rope, hose, in hoisting-engines, &c., although adapted also for "fishing-reels" to be attached to a fishing-rod and manipulated as desired in angling.

The especial object in view is to produce a reel that shall pay out with entire freedom and with as little friction as possible, yet be instantly in gear for winding when desired, and pass from one to the other of these conditions automatically and yet be at the same time set in permanent gear at will by the act of the operator.

To this end the improvement consists mainly in permanently separating the main driving or crank pinion and the driven or reel pinion and making the connection by an intervening idler-pinion carried upon a plate pivotally centered upon the crank-shaft, said idler-pinion being always in mesh with the crank-pinion and by movement of said plate brought into or out of mesh with the reel-pinion.

My invention is illustrated in the accompanying drawings, in which—

Figure 1:
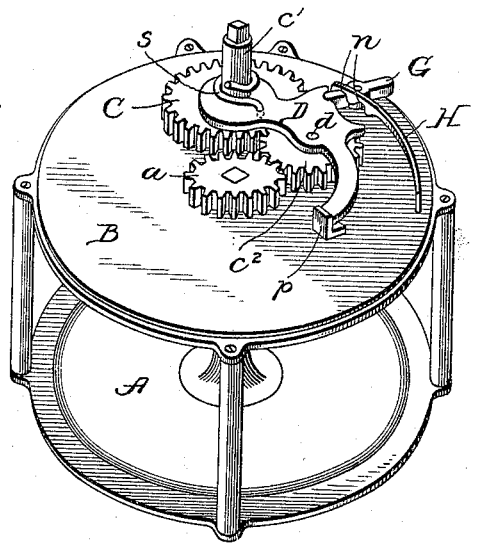
Figure 2:
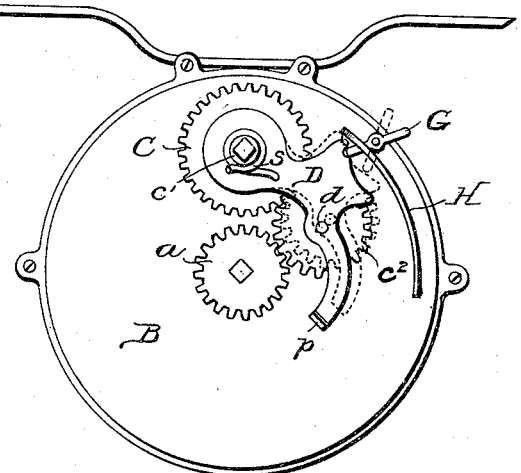

Figure 1 is a perspective view of a reel with my improvement applied, the crank and covering-plate being removed to show the parts in operative relation. Fig. 2 is a plan view of the same, showing in full lines the position of the parts in full gear as shown in Fig. 1 and in dotted lines the position of the parts in disconnected gear, as in running out the line; and Fig. 3, a cross-section taken in the plane passing through the axis of the reel and the axis of the crank-shaft.

Referring now to the drawings accompanying and illustrating this specification, A designates the spool or reel proper; B, the upper plate of the reel-frame; $a$, the reel-pinion, and C the driving-pinion or "crank-pinion." All these are constructed and arranged in the usual manner, excepting that the pivotal stud $c$ of the crank-pinion is sufficiently removed from the axis of the reel to hold the pinions $a$ and C at all times out of mesh. To these I add new parts, constructed, arranged, and operated as follows: To the barrel $c'$ of the driving-pinion C, I attach, pivotally, a plate D, of somewhat crescent shape, carrying a stud $d$, on which is centered an idler-pinion $c^2$, thus held constantly in mesh with the crank-pinion C. The plate D being thus pivotally secured, its oscillation toward or from the pinion $a$ brings the pinion $c^2$ into mesh with the pinion $a$ (thus connecting the reel-pinion with the crank-pinion) or out of mesh, in which latter case the reel is free to revolve independently of its driving connections.

Figure 3:
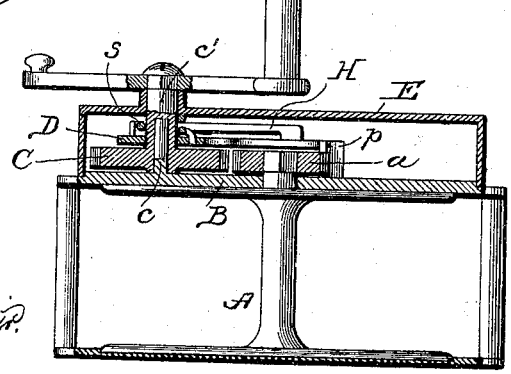

To retain the plate D in ultimate position, I employ a coiled spring $s$, set over the barrel $c'$, secured at one end to the plate D and bearing at the other frictionally against the barrel $c'$ and the top plate or cover E, Fig. 3. The spring $s$ is in slight outward tension against the barrel $c'$, so as to produce the desired friction to hold the idler-pinion $c^2$ in mesh with the reel-pinion $a$ when the crank-pinion C is being operated in winding, but to allow the pinion $c^2$ to be disconnected or unmeshed from the reel-pinion $a$ when the latter is operated in reverse, as by a pull upon the line unwinding from the reel, and to retain such position of disengagement until the crank-pinion is again operated.

To hold the gears positively in engagement when desired, I employ a catch G, pivoted to the plate B and held to ultimate positions by a spring H, also secured to the plate B, and extending over the catch G. The spring H has notches $n$ $n$ at its under side which engage upon and hold the catch in either position of engagement, as illustrated by the full and dotted lines.

A stop $p$ is provided to limit the movement of the plate D in order that the pinions C and $a$ may not be "crowded" by meshing too deep.

The operation is as follows: When the reel mechanism is connected, as shown in full lines, with the catch G in place, the gears are in mesh, as in an ordinary reel, and so remain until the catch G is moved into position shown in dotted lines. When this occurs, the plate D is free to move from the position shown in full lines into that shown in dotted lines, there being nothing to hold the parts in either position except the frictional holding of the spring s, so that the catch being in the position shown in dotted lines a pull upon the line will unwind the reel, at the same time disengaging the pinions $c^2$ and $a$ and forcing the plate D and its pinion into position shown by dotted lines. In such position the catch G acts as a back-stop, limiting the movement of the plate D in that direction. Immediately on operating the crank the former position of engagement is restored, so that the action of engagement or disengagement is automatic. A suitable "click" (not shown) may be provided to engage the pinion $a$ in the usual manner to signal its movement to the ear.

In the practical use of the device if after reeling in it is desirable to leave the reel entirely disengaged a slight reverse movement of the crank will accomplish it, or it may be left to its automatic action already described.

I claim as my invention and desire to secure by Letters Patent of the United States—

1. In a reel, in combination with the driving or crank pinion, and the driven or reel pinion, standing normally disengaged, an idler-pinion, in permanent engagement with the crank-pinion, and adapted to be moved into engagement with the reel-pinion by the winding movement of the crank and thrown out of engagement by the unwinding movement of the reel, substantially as set forth.

2. In a reel, the combination with the driving or crank pinion, and the driven or reel pinion, normally disengaged, of a frame pivotally mounted upon the axial hub or barrel of the driving-pinion, an idler-pinion carried by said frame and permanently in mesh with said driving-pinion and adapted to be moved into engagement with the reel-pinion by the winding movement of the crank and thrown out of engagement by the unwinding movement of the reel, substantially as described.

3. In a reel, the combination with the driving-pinion and the driven pinion, standing normally disengaged, an idler-pinion in permanent engagement with the driving-pinion and adapted to be moved into engagement with the driven pinion by the winding movement of the crank and thrown out of engagement by the unwinding movement of the reel, and means for holding the pinions positively in engagement when desired, substantially as described.

In testimony whereof I have affixed my signature in presence of two witnesses.

ALBERT J. ARNOLD.

Witnesses:
W. B. VAUGHAN,
G. H. WILCOX.